United States Patent
Stratico et al.

(10) Patent No.: US 6,343,762 B1
(45) Date of Patent: Feb. 5, 2002

(54) WINDERS FOR ELECTRIC MOTOR ARMATURES

(75) Inventors: Gianfranco Stratico, Siena; Pasquale Ciarlitto, Florence; Gianni Mazzoni, Siena, all of (IT)

(73) Assignee: Axis Usa, Inc., Tampa, FL (US)

( * ) Notice: Subject to any disclaimer, the term of this patent is extended or adjusted under 35 U.S.C. 154(b) by 0 days.

(21) Appl. No.: 09/495,832

(22) Filed: Feb. 1, 2000

Related U.S. Application Data (60) Provisional application No. 60/118,728, filed on Feb. 4, 1999.

(51) Int. Cl.[7] ............................................. H02K 15/09
(52) U.S. Cl. ............................... 242/433.4; 242/433.3; 29/605
(58) Field of Search .......................... 242/433.1, 433.2, 242/433.3, 433.4, 448; 29/596, 625

(56) References Cited

U.S. PATENT DOCUMENTS

| | | | | |
|---|---|---|---|---|
| 3,006,564 A | * | 10/1961 | Hambleton | 242/433.4 |
| 3,076,613 A | * | 2/1963 | Turk | 242/433.4 |
| 3,098,616 A | * | 7/1963 | Eminger | 242/433.4 |
| 3,911,563 A | * | 10/1975 | Anderson | 29/597 |
| 5,060,781 A | * | 10/1991 | Santandrea et al. | 198/345.1 |
| 5,115,901 A | * | 5/1992 | Santandrea et al. | 198/345.3 |
| 5,127,594 A | * | 7/1992 | Lombardi et al. | 242/433.4 |
| 5,253,912 A | * | 10/1993 | Andorlini et al. | 294/119.1 |
| 5,370,324 A | | 12/1994 | Beakes et al. | |
| 5,372,319 A | * | 12/1994 | Dolgas | 242/433.4 |
| 5,493,770 A | * | 2/1996 | Anichini et al. | 29/597 |
| 5,988,554 A | * | 11/1999 | Taka | 242/433.1 |
| 6,070,826 A | * | 6/2000 | Becheerucci et al. | 242/433.4 |

* cited by examiner

Primary Examiner—Emmanuel M. Marcelo
(74) Attorney, Agent, or Firm—Fish & Neave; Robert R. Jackson (57) ABSTRACT

The present invention discloses methods and apparatus for winding successive differently sized components with coils of wire. More specifically, the present invention is directed to methods and apparatus for winding multiple electric motor armatures in succession, when those armatures have different dimensions. Generally speaking, the invention includes an assembly with movable parts, which enables all armatures to have a common alignment characteristic in the winding apparatus. If necessary, the actual coil winding mechanism will shift to achieve proper positioning relative to each armature. This reduces the number of adjustments that have to be made to hardware that is ordinarily required to wind such differently sized armatures.

38 Claims, 5 Drawing Sheets

WINDERS FOR ELECTRIC MOTOR ARMATURES

CROSS REFERENCE TO RELATED APPLICATIONS

This application claims the benefit of U.S. provisional patent application No. 60/118,728, filed Feb. 4, 1999, which is hereby incorporated by reference in its entirety.

BACKGROUND OF THE INVENTION

The present invention concerns the manufacture of electric motors and generators, and similar apparatus. More specifically, the invention relates to improved solutions for placing coils of wire on different sized armatures using a mechanical winding machine.

Electric motors generally include two main parts—a fixed hollow portion and a core that is placed inside of it. In most cases, the fixed portion is known as a "stator" and the core is the portion that rotates inside the stator, called a "rotor" or an "armature." In a brushless motor, the rotating armature surrounds the fixed stator and rotates around it. The main body core portion typically has slots spaced along its circumference for coiling wire. A commutator provides the electrical connection to the armature. The core and the commutator are mounted in axially spaced relation on a common shaft. The commutator has circumferentially spaced connection points typically known as "tangs" to which the starting and ending leads of the wound coils are physically and electrically connected. While tangs are a commonly available type of connection point, it should be noted that other types of connections are also available. For example, slots are sometimes present on the commutator to which the wire leads may be attached. In either case, electricity supplied to the wire interacts with a magnetic field produced in the stator to create the torque required to operate the motor.

Several machines available in the art are capable of coiling wire on slotted cores. These winding machines have at least one—and usually two—wire applying devices known as "flyers" that rotate about an axis normal to that of the core, drawing wire from a source and winding it around the slots to produce a coil with a desired number of turns. When a coil (or set of coils in the case of a double flyer machine) is finished, the flyers stop and the wire leads are brought next to the tangs or other connection points on the commutator to which they will be attached. The core is then rotationally indexed to present the tangs (or other connection points) to the wire hooking devices, and the flyer wraps wire around them. Rotational indexing also brings the next set of slots into position to receive wire from the flyers. Wire winding machines are disclosed, for example, in U.S. Pat. No. 3,911,563 to Anderson and in U.S. Pat. No. 5,127,594 and U.S. Pat. No. 5,257,745 both to Lombardi et al. and assigned to the assignee of the present application. The contents of each of the above mentioned references are hereby incorporated by reference for their entire teachings.

While such winders are very effective for properly placing wire around cores, difficulties arise when it is desired to next coil wire around a core that does not have the same dimensions as the previously coiled core. Currently available winding machines require the center of each core to be aligned with a fixed axis in the machine. Since cores that have different dimensions have their centers placed at different locations along the common shaft, it becomes difficult to process different sized cores in succession. The present invention is directed to methods and apparatus for efficiently coiling wire around armature or stator cores that are placed in a winding machine in succession, when such successive cores have different dimensions. The invention can thus be easily and precisely adapted to wind wire coils on cores that have different shaft lengths, commutator dimensions, distances from the commutator to the lamination stack and lamination stack lengths.

SUMMARY OF THE INVENTION

According to an aspect of the invention, there is provided an apparatus for winding components that includes a winding system with at least one flyer winder, wherein the winding system is mounted to a support structure. The apparatus also includes a loading device which receives a component from a supply source and transports it a distance along a path to extend it into the winding system, and a transport system which moves the support structure along the path and aligns the component in the winding system at a desired position along the path. The desired alignment position is determined by a dimension of the component.

According to another aspect of the invention, there is provided an apparatus for winding components which includes a winding system with at least one flyer winder, and a loading device which receives an electric motor core from a supply source and transports it a distance along a path to extend it into the winding system to receive a wire coil. The core has at least one tang, and the apparatus also includes a termination device fixed at an end of the path for connecting the wire coil to the tang.

According to yet another aspect of the invention there is provided a method of winding components which includes transporting a component along a path to extend it in a winding system. The winding system is mounted on a support structure, and the method further includes moving the support structure along the path to align the component in the winding system at a desired position. The desired alignment position is determined by a dimension of the component. The method also includes the step of winding wire on at least a portion of the component while the component is extended in the winding system.

The present invention has significant advantages over current armature winding methods and devices. First, it enables a winding machine to coil multiple armatures in succession without requiring extensive adjustments to be made to the machinery each time the dimensions of an armature being coiled vary from those coiled before it. One embodiment of the invention also allows for a single loading distance, regardless of the dimensions of the armature.

DETAILED DESCRIPTION OF EXEMPLARY EMBODIMENTS

Figure 1:
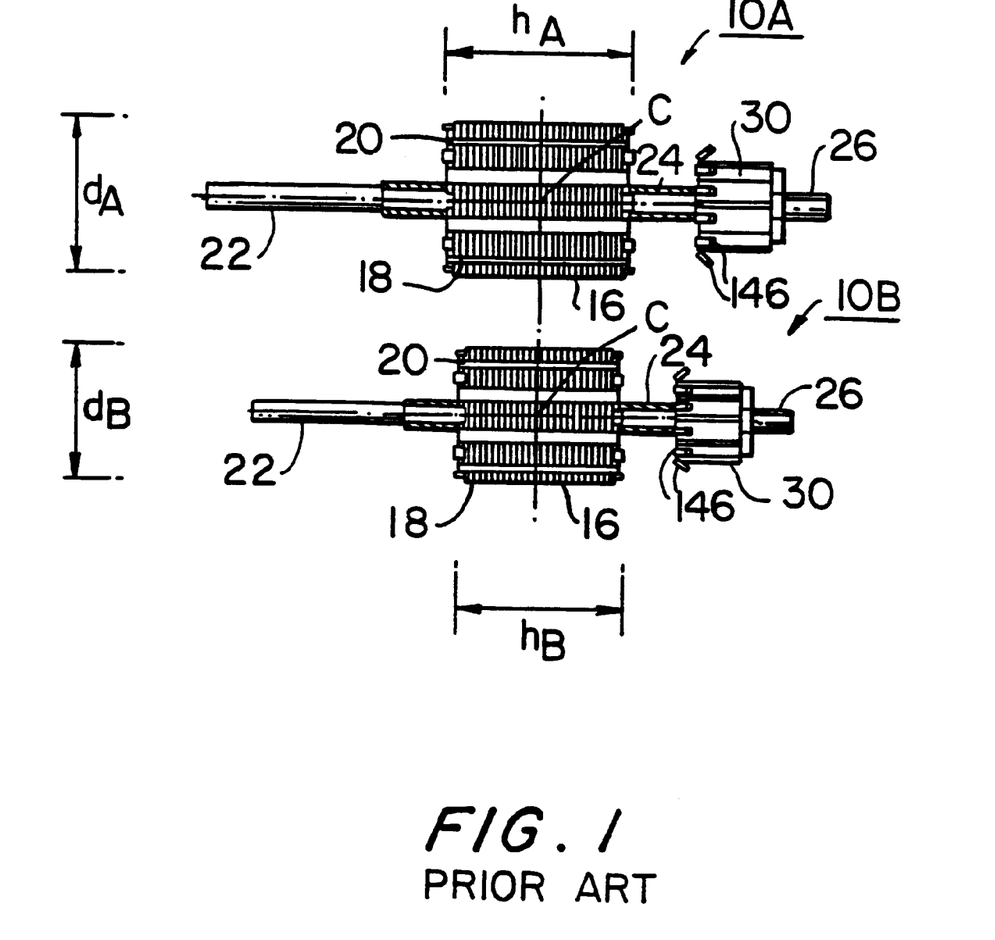
FIG. 1 contains a detailed illustration of two differently sized armatures available in the art, which can be wound in succession using the present invention.

Turning now to the drawings which are provided to illustrate embodiments of the invention and not for limiting same, FIG. 1 shows two armatures 10A and 10B currently available in the art that may be placed in the present invention to receive electrical wire from an external source. While the invention will be described with an electric motor armature serving as the component having the core about which coils will be placed, those skilled in the art will recognize that the invention can also be used with any generally similar component having a core with radially outwardly opening slots that extend axially along the core and that are spaced from one another circumferentially around the core, thereby making it possible to wind coils of wire on the component with a flyer-type winder. Specific examples of other component types that can thus be used with the invention include armatures for electrical generators and stators for brushless electric motors. Each armature has a main body 16 which principally comprises a lamination stack 18. Slots 20 are located around the circumference of each lamination stack 18 to receive the wire. The geometric center of each lamination stack 18 is indicated with a cross mark, and the letter "C." Main body 16 and a commutator 30 are mounted on a shaft 22, spaced apart by a section 24. A shaft section 26 extends from commutator 30 to the rightmost end of shaft 22 as shown in the illustration. Leads from the wires are connected to commutator 30.

Electric motor cores come in a variety of sizes, as shown in FIG. 1 where armature 10A is larger than armature 10B. In the illustration provided, both the diameter $d_a$ and height $h_A$ of main body 16 of armature 10A are larger than the diameter $d_B$ and height $h_B$ of the main body of armature 10B. Similarly the diameter and height of the commutator of armature 10A are larger than the corresponding parts of armature 10B. While the illustrations provided and described here show all dimensions in one armature being larger than the corresponding dimensions in the other armature, those skilled in the art will recognize that this is not always the case, and that such configurations will not be required to practice the invention. Thus, armature 10A may be provided with a main body that is larger than the core of armature 10B, but with a commutator that is smaller than the commutator of armature 10B. Or the invention can be adapted to coil wire around an armature for which both section 24 and section 26 are longer in armature 10A than in armature 10B, while in still another armature only one section will be longer than the corresponding section in the other armature.

Figure 2:
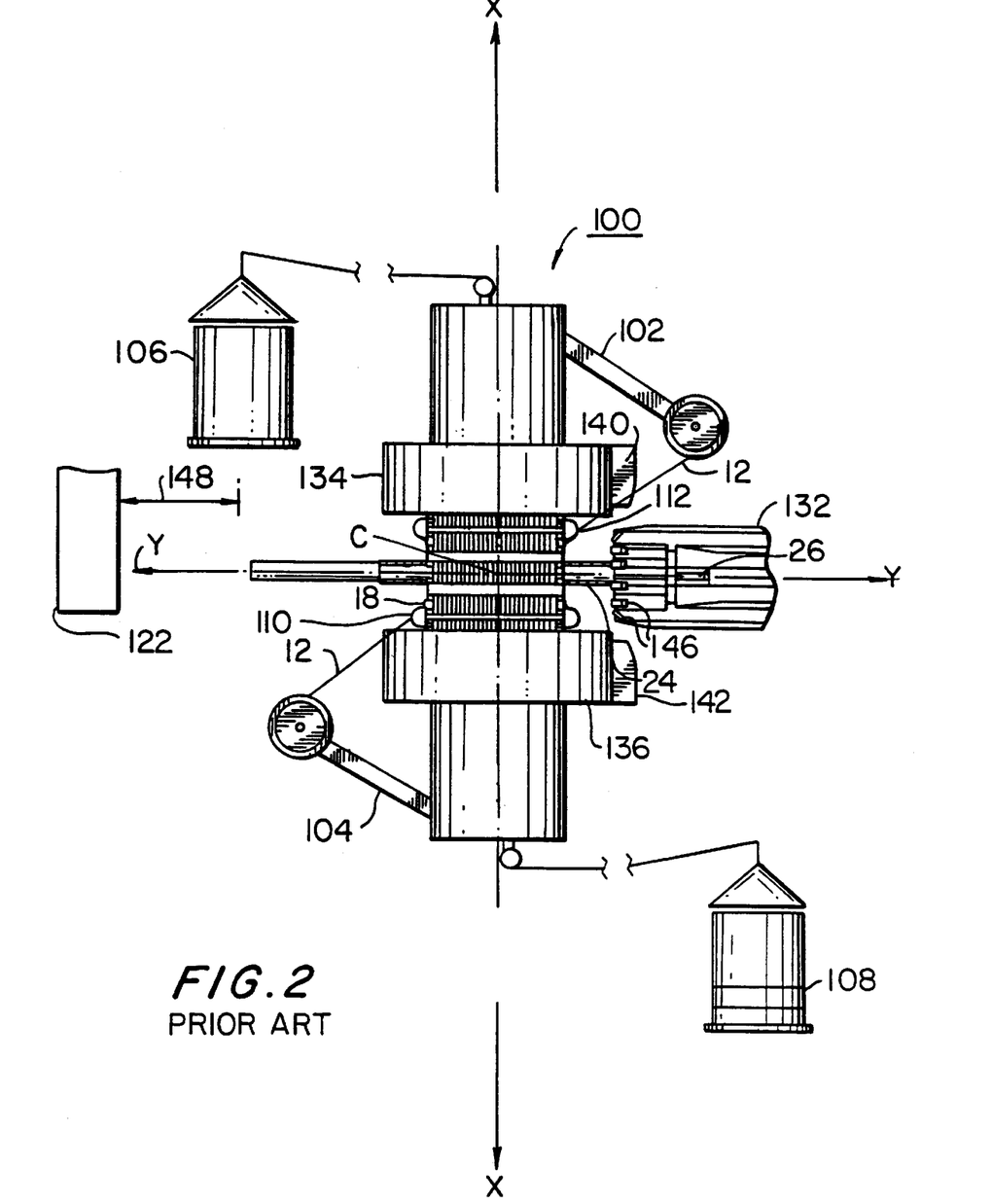
FIG. 2 depicts an example of a prior art double flyer winder that may be used in the coil winding system of the present invention.

Referring now to FIG. 2, an example of a winding machine 100 that may be found in the art and used with the present invention will be briefly described. For simplicity, the invention will hereinafter be described with reference to a double flyer type of winding machine, but those skilled in the art will appreciate that it could be adapted for use with an apparatus that includes one or more flyers, or that it could be used with other devices that can be used to wrap coils of wire around an electric motor core. An armature such as 10A illustrated in FIG. 1 will typically be mounted in winder 100 as shown. Significantly, the geometric center C of lamination stack 18 is mounted such that it lies along axis "X" which passes through the axis of rotation of flyers 102 and 104 of the winder. Flyers 102 and 104 draw wire 12 from sources 106 and 108, and rotate about axis X to form coils 110 and 112 in slots 20 of lamination stack 18.

As stated earlier, axis X is located at the center of rotation of flyers 102 and 104, and geometric center C for all armatures is preferably positioned on this axis. Thus if an armature 10A is removed from winder 100 and replaced by armature 10B, the differences in the dimensions for the remaining portions of the armatures force commutator 30 and sections 24 and 26 of shaft 22 to be shifted along longitudinal axis Y, which lies normal to axis X. That is, the locations along axis Y in which the parts other than main body 16 will be located will not be the same as those where the corresponding parts of the previously processed armature were positioned. This will require several adjustments to be made to hardware associated with winder 100 as armatures that have different dimensions are processed in succession.

For example, a loading gripper 122 is typically provided with a load/unload device to support and transport unwound armatures to the winder and to move processed armatures to a holding gripper 132. In the prior art, the distance 148 that loading gripper 122 will travel in order to deliver the armature to the winder must be changed each time an armature that has dimensions that vary from the previously wound armature will be processed. While this procedure may be acceptable at times, it also has its disadvantages. For example, holding gripper 132 will typically have to be changed to one with appropriate dimensions in order to properly position the armature with respect to flyers 102 and 104 and winding guides 134 and 136. A holding gripper 132 may also be replaced with one that can be abutted against outer surface 202 of the commutator during winding and indexing. Otherwise it may not be possible to properly index the armature to connect leads to connection points or to present unwound slots for winding by the flyers.

Figure 3:
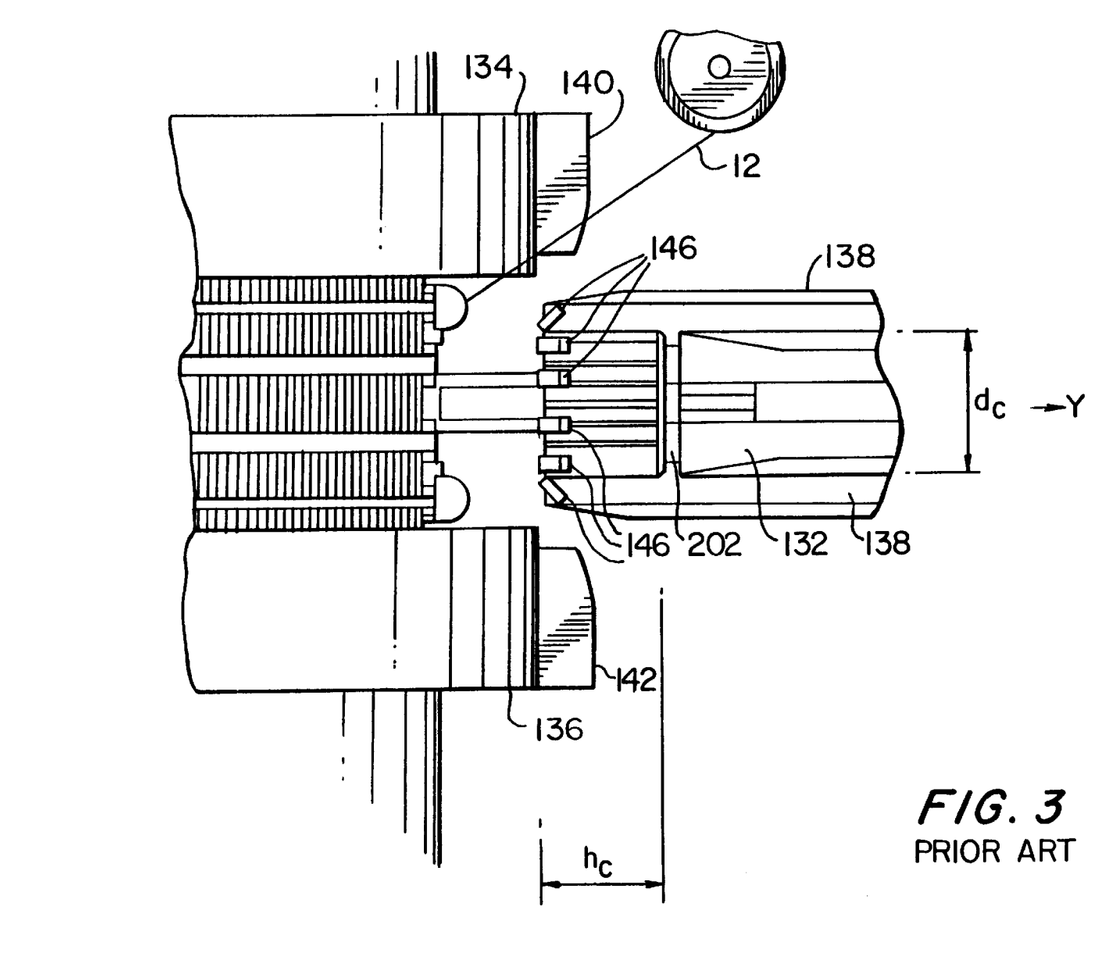
FIG. 3 contains a magnified view illustrating a commutator being supported by a holding gripper.

Turning now to FIG. 3, prior art winding devices also require shielding tubes 138 (which surround the commutator and holding gripper during winding) to be translated along axis Y as the location of commutator 30 changes. The shielding tubes may also have to be replaced with tubes that can accommodate variations in the size of holding gripper 132 and commutator 30 (i.e. having a diameter $d_C$ or depth $h_C$.) Hooking plates 140 and 142, which must be aligned with respect to tangs 146 or other commutator connection points in order to properly assist in attaching the leads to the commutator as the coils are wound, may also have to be repositioned. Winding guides 134 and 136 may also have to be altered in order to accommodate such changes. In one embodiment of the invention, hooking plates 140 and 142 operate as described, for example, in U.S. Pat. No. 5,493,770 to Anichini et al., assigned to the assignee of the present invention, and hereby incorporated by reference in its entirety. One way to change the wire guides to cope with the differences in length of the lamination stack has been described in U.S. Pat. No. 5,257,745 to Lombardi et al., also assigned to the assignee of the present invention, and hereby incorporated by reference in its entirety.

Figure 4:
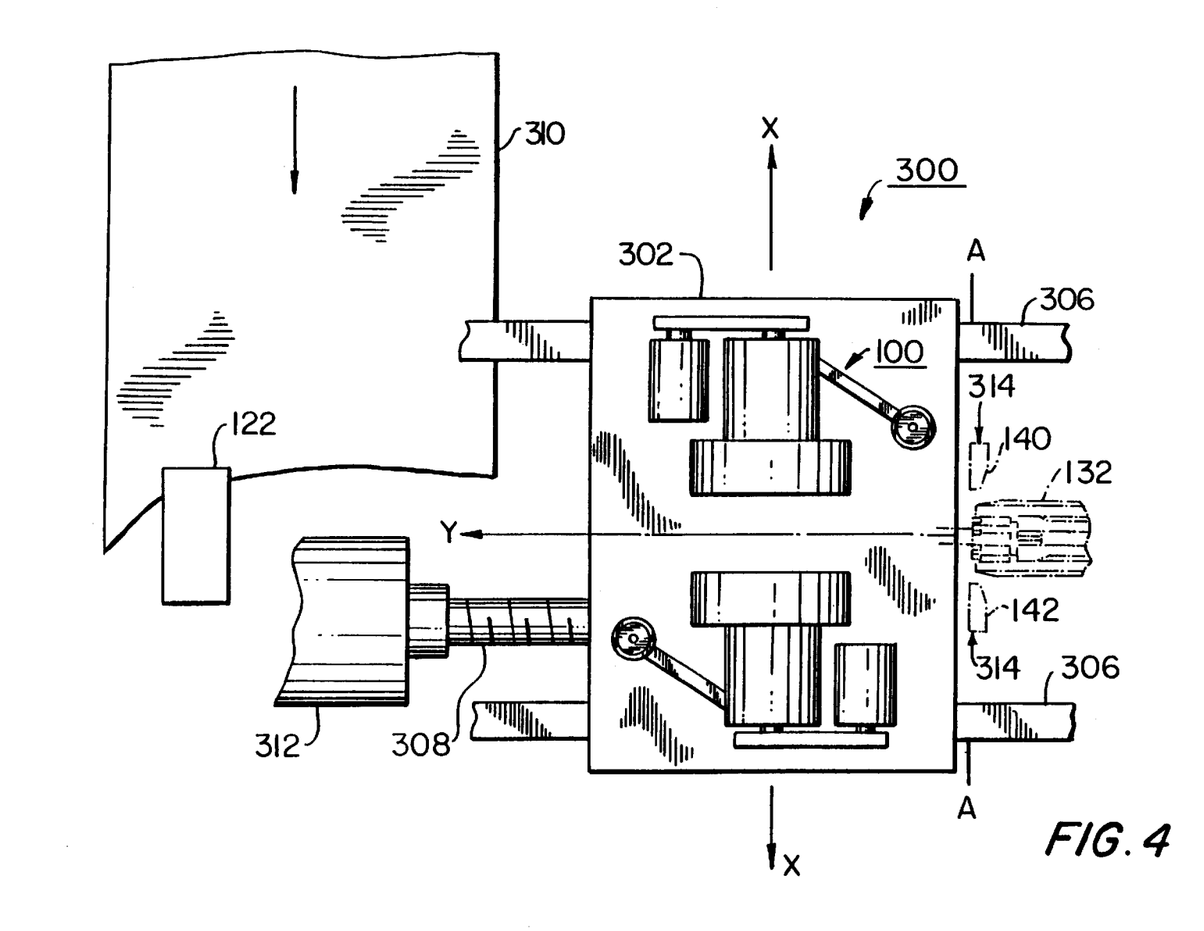
FIG. 4 shows an example of a winding system that positions different sized armatures in a winder in succession according to the invention.

Referring now to FIG. 4, the present invention efficiently winds successive armatures that have different dimensions. As indicated in the illustration, the invention includes a winding system 300 which, in the preferred embodiment, will include a double flyer winder 100. Winding system 300 is mounted on a support structure 302 which will typically be a rigid platform or plate, but which may take on any shape and flexibility that may be advantageous for using winding system 300. Loading gripper 122 will typically be located in close proximity to winding system 300. Quite often, loading gripper 122 will be associated with a conveyor system 310 which transports armatures along a path from a separate assembly area to winding system 300. It may instead be associated with another type of motor core supply (including manual) from which it receives armatures. Loading gripper 122 removes the unprocessed armatures from the supplier, and extends them into winding system 300 for proper alignment.

Figure 5:
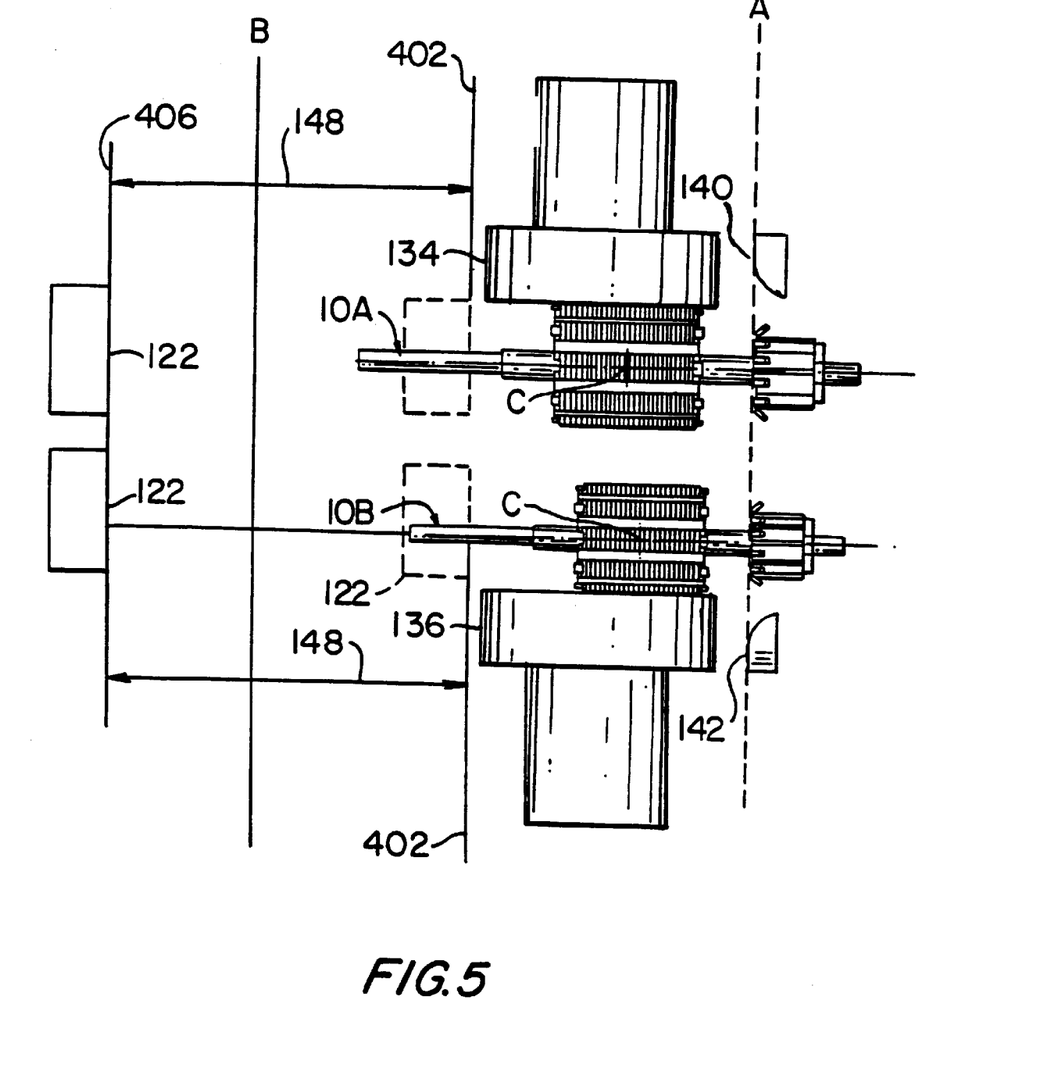
FIG. 5 shows a manner of positioning armatures with different sizes and dimensions in a winding machine according to the present invention.

Turning to FIG. 5, in the preferred embodiment of the invention loading gripper 122 will travel the same distance 148 toward winding system 300, regardless of the size or dimensions of the armature 10 being transported. This feature greatly simplifies the design and use of the load/unload device. However, it should be noted that it is possible to use a load/unload device that provides for a variable distance 148 with the invention, or to leave distance 148 constant while sets of armatures that have sizes within a given range are processed and then alter the distance to process another set. It is intended to embrace all such alternatives, and while providing a constant distance 148 is advantageous, the invention is not limited to such use.

Armatures 10A and 10B (first shown in FIG. 1) are illustrated together in FIG. 5 in order to allow for comparison. It should be noted that multiple armatures will not typically be placed simultaneously in a winding system 300. Both armatures are aligned with a reference axis A, in accordance with the invention. Before armatures are delivered to loading gripper 122, tangs 146 (or other points at which wires are connected to the commutator) for all armatures to be processed will be positioned along a common reference axis on the conveyor such as axis B. Positioning of tangs 146 along a common axis may be accomplished using an adjustable pallet transport such as that described in U.S. Pat. Nos. 5,060,781 and 5,115,901 both to Santandrea et al., assigned to the assignee of the present invention and hereby incorporated by reference in their entirety for their teachings.

In one embodiment of the invention, loading gripper 122 will receive each armature at position 406 and transport it toward holding gripper 132 until it reaches position 402. In another embodiment of the invention, loading gripper 122 will support the armature along its lamination stack until it is properly placed in winding system 300. An example of a loading gripper 122 that is capable of performing this function is disclosed in U.S. Pat. No. 5,253,912 to Andorlini et al., assigned to the assignee of the present invention and hereby incorporated by reference in its entirety for its teachings.

Aligning tangs 146 as described places lamination stacks 18 in proper position to enable loading gripper 122 to support the armature along the lamination stack and repeatedly transport successive armatures through distance 148 to winder 100. As stated earlier, loading gripper 122 may transport these successively processed armatures through a constant distance regardless of the size of the armature. Aligning tangs 146 with axis B also causes them to be aligned with axis A once they are placed in the winder after the loading gripper travels through its constant length stroke. This is true for any and all possible armature sizes. Thus, according to the invention, the respective centers C will be placed in various locations along axis Y as illustrated in FIG. 5.

Turning back to FIG. 4, winding system 300 includes a transport system which drives support structure 302 down a path along axis Y, and places it in position along the axis in the position that is most appropriate based upon the dimensions of the armature. Winding guides 134 and 136 are then brought in contact with or adjacent to the armature stack, and loading gripper 122 is returned to position 406.

While many systems will successfully transport support structure 302 and the items mounted thereon along axis Y in accordance with the invention, the preferred embodiment of such a transport system is provided in FIG. 4. Here, support structure 302 is attached to guides 306, which run parallel to axis Y. While two guides 306 are shown supporting support structure 302 here, those skilled in the art will recognize that it is possible to practice the invention using one guide or three or more guides. A device that can propel support structure 302 or otherwise cause it to move along axis Y on guides 306 is also included. In the preferred embodiment, such a device includes a drive screw 308 which is mounted to support structure 302 and a motor 312 which rotates the drive screw to cause support structure 302 to move along guides 306. Motor 312 may be controlled as needed to place support structure 302 in any desired position parallel to axis Y to allow armatures of any size to be wound correctly. As explained earlier, the desired positioning of support structure 302 is that which causes center C of the armature to be aligned with axis X, which passes through the rotation center of the winder. Winder 300 may optionally include an additional device to unload armatures from the winder once coils have been properly placed upon them.

Turning for a moment to FIG. 3, holding gripper 132 can be changed in order to accommodate shaft sections 26 or commutators 30 with different sizes. Thus if necessary, a holding gripper that can accommodate a larger or smaller commutator diameter $d_C$ or commutator height $h_C$ can be substituted for the one that is presently in place. The rear of all commutators 30 will preferably abut against the forward portion 202 of holding gripper 132 when the armature is positioned inside winder 100, regardless of the size of the armature.

Referring back to FIG. 4, hooking plates 140 and 142 can also be permanently aligned with reference axis A. They will preferably be moved inward in the direction of arrows 314 and placed adjacent to commutator 30 in order to guide the wire leads into proper position around tangs 146. The device used to perform this function should be located separately from support structure 302 and will preferably be fixed at the end of the path traveled by loading gripper 122 near holding gripper 132. In one embodiment of the invention, air driven cylinders will be used to move hooking plates 140 and 142. It should be noted here that quite often the size of tangs 146 will remain the same regardless of any change in the size of lamination stack 18, of the length of shaft 22 or the length of section 26. When that is the case, hooking plates 140 and 142 may not need to be altered at all.

It is, therefore, apparent that there has been provided in accordance with the present invention, methods and apparatus for winding electric motor cores that fully satisfy the aims and advantages hereinbefore set forth. While this invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for winding components, comprising:
   a winding system that includes at least one flyer winder, said winding system being mounted to a support structure;
   a loading device which receives a component from a supply source and transports it a distance along a path normal to an axis of rotation of said flyer winder to extend it into said winding system; and
   a transport system which moves said support structure along said path and aligns said component in said winding system at a desired alignment position along said path, wherein said desired alignment position is determined by a dimension of said component.

2. An apparatus for winding components as claimed in claim 1 wherein said winding system includes a reference plane with which each component extended therein will be aligned.

3. An apparatus for winding components as claimed in claim 2 wherein said component includes a core portion, and wherein said winding system causes a coil of wire to be placed on said core portion.

4. An apparatus for winding components as claimed in claim 3 wherein said desired alignment position is that which aligns said core portion with an axis of rotation of a flyer in said winding system.

5. An apparatus for winding components as claimed in claim 1 wherein said loading device transport distance is variable.

6. An apparatus for winding components as claimed in claim 5 wherein said loading device transport distance is dependent upon a dimension of a component being placed in said winding system.

7. An apparatus for winding components, comprising:
    a winding system that includes at least one flyer winder, said winding system being mounted to a support structure;
    a loading device which receives a component from a supply source and transports it a distance along a path to extend it into said winding system, said component includes a core portion, and wherein said winding system causes a coil of wire to be placed on said core portion;
    a transport system which moves said support structure along said path and aligns said component in said winding system at a desired alignment position along said path, wherein said desired alignment position is determined by a dimension of said component and is that which aligns said care portion with an axis of rotation of said flyer winder in said winding system; and
    said winding system includes a reference plane with which each component extended therein will be aligned such that a plane of a commutator portion of said core portion is aligned with said winding system reference plane.

8. An apparatus for processing components, comprising:
    a winding system that includes at least one flyer winder, said winding system being mounted to a support structure;
    a loading device which receives a component from a supply source and transports it a distance along a path to extend it into said winding system;
    a transport system which moves said support structure along said path and aligns said component in said winding system at a desired alignment position along said path, wherein said desired alignment position is determined by a dimension of said component; and
    said transport system further comprises:
        a guide bar which supports said support structure;
        a drive screw connected to said support structure; and
        a motor which rotates said drive screw, thereby causing said support structure to move along said guide bar.

9. An apparatus for winding components, comprising:
    a winding system that includes at least one flyer winder, said winding system being mounted to a support structure;
    a loading device which receives a component from a supply source and transports it a distance along a path to extend it into said winding system, said component includes a core portion, and wherein said winding system causes a coil of wire to be placed on said core portion; and
    a transport system which moves said support structure along said path and aligns said component in said winding system at a desired alignment position along said path, wherein said desired alignment position is determined by a dimension of said component;
    a terminating device located at an end of said path which assists in connecting wire leads to a commutator portion of said core portion; and
    said winding system includes a reference plane with which each component extended therein will be aligned.

10. An apparatus for winding components, comprising:
    a winding system that includes at least one flyer winder and includes a reference plane with which each component extended therein will be aligned, said winding system being mounted to a support structure;
    a loading device which receives a component from a supply source and transports it a distance along a path to extend it into said winding system, wherein said loading device transport distance remains constant for all components extended into said winding system; and
    a transport system which moves said support structure along said path and aligns said component in said winding system at a desired alignment position along said path, wherein said desired alignment position is determined by a dimension of said component.

11. An apparatus for winding components as claimed in claim 10 wherein said component includes a core portion, and wherein said winding system causes a coil of wire to be placed on said core portion.

12. An apparatus for winding components as claimed in claim 11 wherein said desired alignment position is that which aligns said core portion with an axis of rotation of a flyer in said winding system.

13. An apparatus for winding components as claimed in claim 12 further comprising a terminating device located at an end of said path which assists in connecting wire leads to a commutator portion of said core portion.

14. An apparatus for winding components of different dimensions, comprising:
    a winding system that includes at least one flyer winder;
    a loading device which receives a component from a supply source and transports it a distance along a path to extend it into said winding system to receive a wire coil, said component having at least one tang; and
    a termination device fixed at an end of said path for connecting said wire coil to said tang regardless of the dimension of said component.

15. An apparatus for winding components as claimed in claim 14 further comprising:
    a support structure upon which said winding system is mounted; and
    a transport system which moves said support structure along said path and aligns said component in said winding system at a desired position along said path, said desired position being determined by a dimension of said component.

16. An apparatus for winding components as claimed in claim 14 wherein said loading device transport distance is a constant value for all components extended into said winding system.

17. An apparatus for winding components as claimed in claim 14 wherein said loading device transport distance is variable.

18. An apparatus for winding components as claimed in claim 17 wherein said loading device transport distance is dependent upon a dimension of a component being placed in said winding system.

19. An apparatus for winding components as claimed in claim 17 wherein said winding system includes a double flyer winder.

20. A method of winding components, comprising the steps of:
   transporting a component along a path to extend it into a winding system that includes at least one flyer winder, said path extending in a direction normal to an axis of rotation of said flyer winder, and said winding system being mounted on a support structure;
   moving said support structure along said path to align said component in said winding system at a desired alignment position, wherein said desired alignment position is determined by a dimension of said component; and
   winding wire on at least a portion of said component while said component is extended in said winding system.

21. A method of winding components as claimed in claim 20 wherein said moving step further comprises positioning each component along a reference plane in said winding system.

22. A method of winding components as claimed in claim 20 wherein said transporting step further comprises moving said component a distance along said path that is dependent upon a dimension of a component that is extended into said winding system.

23. A method of winding components as claimed in claim 20 wherein said transporting step further comprises placing a geometric center of a main body of said component along an axis of rotation of a flyer in said winding system.

24. A method of winding components, comprising the steps of:
   transporting a component along a path to extend it into a winding system that includes at least one flyer winder, said winding system being mounted on a support structure;
   said transporting step further comprises maintaining a constant component transport distance when successive components with different dimensions are extended into said winding system;
   moving said support structure along said path to align said component in said winding system at a desired alignment position, wherein said desired alignment position is determined by a dimension of said component; and
   winding wire on at least a portion of said component while said component is extended in said winding system.

25. A method of winding components further comprising the steps of:
   transporting a component along a path to extend it into a winding system that includes at least one flyer winder, said winding system being mounted on a support structure;
   moving said support structure along said path to align said component in said winding system at a desired alignment position, wherein said desired alignment position is determined by a dimension of said component;
   winding wire on at least a portion of said component while said component is extended in said winding system; and
   connecting wire leads to a commutator portion of said component after said wire is wound on said component.

26. A method of winding components comprising the steps of:
   transporting a component along a path to extend it into a winding system that includes at least one flyer winder, said winding system being mounted on a support structure;
   said transporting step further comprises rotating a drive screw attached to said support structure, thereby causing said support structure to move along a guide bar;
   moving said support structure along said path to align said component in said winding system at a desired alignment position, wherein said desired alignment position is determined by a dimension of said component; and
   winding wire on at least a portion of said component while said component is extended in said winding system.

27. A method of winding components, comprising the steps of:
   transporting a component along a path to extend it into a winding system that includes at least one flyer winder, wherein a component transport distance remains constant regardless of a size of said component;
   moving a support structure with said winding system mounted thereon along said path to align said component in said winding system at a desired alignment position, wherein said desired alignment position is determined by a dimension of said component; and
   winding wire on at least a portion of said component while said component is extended into said winding system.

28. A method of winding components as claimed in claim 27 wherein said moving step further comprises positioning each component along a reference plane in said winding system.

29. A method of winding components as claimed in claim 27 wherein said transporting step further comprises placing a geometric center of a main body of said component along an axis of rotation of a flyer in said winding system.

30. A method of winding components as claimed in claim 27 further comprising connecting wire leads to a commutator portion of said component after said wire is wound on said component.

31. A method of winding components as claimed in claim 27 wherein said transporting step further comprises rotating a drive screw attached to said support structure, thereby causing said support structure to move along a guide bar.

32. A method of winding components of different dimensions, comprising the steps of:
   transporting a component along a path to extend it into a winding system that includes at least one flyer winder, said winding system being mounted on a support structure;
   moving said support structure along said path to align said component in said winding system at a desired alignment position, wherein said desired alignment position is determined by a dimension of said component;
   winding wire on at least a portion of said component while said component is extended in said winding system; and
   attaching a portion of said wire to a tang mounted to said component using a termination device that is fixed at an end of said path regardless of the dimension of said component.

33. A method of winding components as claimed in claim 32 wherein said moving step further comprises positioning each component along a reference plane in said winding system.

34. A method of winding components as claimed in claim 32 wherein said transporting step further comprises moving said component a distance along said path that is dependent upon a dimension of a component that is extended into said winding system.

35. A method of winding components as claimed in claim 32 wherein said transporting step further comprises maintaining a constant component transport distance when successive components with different dimensions are extended into said winding system.

36. A method of winding components as claimed in claim 32 wherein said transporting step further comprises placing a geometric center of a main body of said component along an axis of rotation of a flyer in said winding system.

37. A method of winding components as claimed in claim 32 further comprising connecting wire leads to a commutator portion of said component after said wire is wound on said component.

38. A method of winding components as claimed in claim 32 wherein said transporting step further comprises rotating a drive screw attached to said support structure, thereby causing said support structure to move along a guide bar.

* * * * *